United States Patent
Gulland

(10) Patent No.: US 11,868,864 B2
(45) Date of Patent: Jan. 9, 2024

(54) IMPLEMENTING NEURAL NETWORKS IN FIXED POINT ARITHMETIC COMPUTING SYSTEMS

(71) Applicant: Google LLC, Mountain View, CA (US)

(72) Inventor: William John Gulland, Novato, CA (US)

(73) Assignee: Google LLC, Mountain View, CA (US)

( * ) Notice: Subject to any disclaimer, the term of this patent is extended or adjusted under 35 U.S.C. 154(b) by 946 days.

(21) Appl. No.: 16/830,922

(22) Filed: Mar. 26, 2020

(65) Prior Publication Data

US 2020/0226445 A1   Jul. 16, 2020

Related U.S. Application Data

(63) Continuation of application No. 15/432,842, filed on Feb. 14, 2017, now Pat. No. 10,650,303.

(51) Int. Cl.
*G06N 3/04* (2023.01)
*G06F 7/483* (2006.01)
(Continued)

(52) U.S. Cl.
CPC .............. *G06N 3/04* (2013.01); *G06F 5/012* (2013.01); *G06F 7/483* (2013.01); *G06N 3/063* (2013.01);
(Continued)

(58) Field of Classification Search
None
See application file for complete search history.

(56) References Cited

U.S. PATENT DOCUMENTS

2010/0050025 A1   2/2010   Grichnik
2011/0016162 A1   5/2011   Pechanek
(Continued)

FOREIGN PATENT DOCUMENTS

CN    102981854 A    3/2013
CN    105760933 A    7/2016
(Continued)

OTHER PUBLICATIONS

'www.embedded.com' [online] "Working with floating point parameters in an integer world," Apr. 4, 2008, [retrieved on Feb. 13, 2017] Retrieved from Internet: URL<http://www.embedded.com/design/real-time-and-performance/4007545/Working-with floating-point-parameters-in-an-integer-world> 3 pages.
(Continued)

*Primary Examiner* — David R Vincent
(74) *Attorney, Agent, or Firm* — Fish & Richardson P.C.

(57) ABSTRACT

Methods, systems, and computer storage media for implementing neural networks in fixed point arithmetic computing systems. In one aspect, a method includes the actions of receiving a request to process a neural network using a processing system that performs neural network computations using fixed point arithmetic; for each node of each layer of the neural network, determining a respective scaling value for the node from the respective set of floating point weight values for the node; and converting each floating point weight value of the node into a corresponding fixed point weight value using the respective scaling value for the node to generate a set of fixed point weight values for the node; and providing the sets of fixed point floating point weight values for the nodes to the processing system for use in processing inputs using the neural network.

32 Claims, 3 Drawing Sheets

(51) Int. Cl.
    G06N 3/063      (2023.01)
    G06F 5/01       (2006.01)
    G06N 3/08       (2023.01)
(52) U.S. Cl.
    CPC ....... *G06N 3/08* (2013.01); *G06F 2207/3824* (2013.01); *G06F 2207/4824* (2013.01)

(56) References Cited

U.S. PATENT DOCUMENTS

| | | | |
|---|---|---|---|
| 2011/0161625 A1* | 6/2011 | Pechanek | G06F 9/3001 |
| | | | 712/11 |
| 2016/0328646 A1 | 11/2016 | Lin | |
| 2017/0011288 A1 | 1/2017 | Brothers | |
| 2017/0061279 A1* | 3/2017 | Yang | G06N 3/084 |
| 2017/0220929 A1* | 8/2017 | Rozen | G06N 3/063 |
| 2018/0349772 A1* | 12/2018 | Tokui | G06F 8/311 |

FOREIGN PATENT DOCUMENTS

| | | |
|---|---|---|
| TW | 305998 | 5/1997 |
| TW | 201232429 A | 8/2012 |
| WO | WO 2016/039651 | 3/2016 |

OTHER PUBLICATIONS

'www.sc231n.github.io' [online] "CS231n Convolutional Neural Networks for Visual Recognition," [retrieved on Feb. 13, 2017] Retrieved from Internet: URI<http://cs231n.github.io/neural-networks-2/> 12 pages.
'www.sebastianraschka.com' [online] "About Feature Scaling and Normalization—and the effect of standardization for machine learning algorithms," Jul. 11, 2014 [retrieved on Feb. 13, 2017] Retrieved from Internet: URL<http://sebastianraschka.com/Articles/2014_about_feature_scaling.html> 21 pages.
CN Office Action in Chinese Application No. 201810152235.0, dated Aug. 30, 2019, 19 pages (with English translation).
CN Office Action in Chinese Appln. No. 201810152235.0, dated Mar. 26, 2019, 26 pages.
CNU Office Action issued in Chinese Application No. 201820260832.0, dated Jul. 26, 2018, 5 pages (with English translation).
Extended European Search Report issued in European Application No. 18156667.0, dated May 9, 2018, 12 pages.
GB Combined Search and Examination Report issued in British Application No. GB1802414.1, dated Aug. 15, 2018, 9 pages.
Goodhill et al. "The Role of Weight Normalization in Competitive Learning," Neural Computation 6.2, Mar. 1994, 10 pages.
International Search Report and Written Opinion issued in International Application No. PCT/US2018/018184, dated May 4, 2018, 17 pages.
Lange. "Design of a Generic Neural Network FPGA—Implementation," Proceedings of the Chemnitz University of Technology Faculty of Electrical Engineering and Information Technology, Professorship of Circuit and Systems Design, Nov. 2, 2005, 142 pages.
Lin et al. "Fixed Point Quantization of Deep Convolutional Networks," arXiv 1511.06393v3, Jun. 2, 2016, 10 pages.
PCT International Preliminary Report on Patentability and Written Opinion in International Application No. PCT/US2018/018184, dated Aug. 20, 2019, 10 pages.
Salimans et al. "Weight Normalization: A Simple Reparameterization to Accelerate Trailing of Deep Neural Networks," arXiv preprint arXiv 1602.07868v3, Jun. 4, 2016, 11 pages.
TW Office Action in Taiwanese Application No. 107105678, dated Jul. 3, 2019, 5 pages (with English translation).
TW Office Action issued in Taiwanese Application No. dated Dec. 19, 2018, 4 pages (English translation).
TWU Office Action issued in Taiwanese Application No. dated Jul. 13, 2018, 2 pages (English Translation).
Vanhoucke et al. "Improving the speed of neural networks on CPUs," Proceedings of the Deep Learning and Unsupervised Feature Learning NIPS Workshop, Dec. 17, 2011, 8 pages.
Office Action in Taiwanese Appln. No. 110115931, dated May 25, 2022, 4 pages (with English Translation).
EP Summons to Attend Oral Proceedings in European Application No. 18156667.1, dated Jan. 21, 2021, 12 pages.
GB Office Action in Great Britain Application No. GB1802414.1, dated Jan. 26, 2021, 12 pages.
EP Office Action in European Application No. 18156667.0, dated Jul. 7, 2020, 10 pages.

* cited by examiner

IMPLEMENTING NEURAL NETWORKS IN FIXED POINT ARITHMETIC COMPUTING SYSTEMS

CROSS-REFERENCE TO RELATED APPLICATION

This application is a continuation of and claims priority to U.S. patent application Ser. No. 15/432,842, filed on Feb. 14, 2017. The disclosure of the prior application is considered part of and are incorporated by reference in the disclosure of this application.

BACKGROUND

This specification relates to implementing neural networks on processing systems that perform neural network computations using fixed point arithmetic.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes how a system can implement a neural network in a processing system that performs neural network computation using fixed point arithmetic. To do so, the system converts floating point weight values for each node of the neural network to corresponding fixed point weight values using scaling values generated from the floating point weight values of the node. The system also converts fixed point output value of each node of the last neural network layer to a corresponding floating point weight value using the scaling value of the respective node.

In general, one innovative aspect of the subject matter described in this specification can be embodied in methods that include the actions of receiving a request to process a neural network using a processing system that performs neural network computations using fixed point arithmetic, the neural network comprising a plurality of layers, each layer having a plurality of nodes, and each node of each layer having a respective set of floating point weight values; for each node of each layer: determining a respective scaling value for the node from the respective set of floating point weight values for the node; and converting each floating point weight value of the node into a corresponding fixed point weight value using the respective scaling value for the node to generate a set of fixed point weight values for the node; and providing the sets of fixed point floating point weight values for the nodes to the processing system for use in processing inputs using the neural network.

The foregoing and other embodiments can each optionally include one or more of the following features, alone or in combination. In particular, one embodiment includes all the following features in combination.

The method further comprises receiving a set of fixed point output values generated by the processing system for a last layer of the plurality of layers, each fixed point output value corresponding to a respective node of the last layer; and converting each of the fixed point output values to a respective floating point output value using the scaling value for each node of the last layer corresponding to the fixed point output value. The method further comprises receiving a set of floating point input values for each of one or more input layer nodes of the neural network, wherein each of the one or more input layer nodes is in an input layer of the plurality of layers of the neural network; converting each floating point input value of each input layer node using the respective scaling value for respective input layer node to generate a set of fixed point input values for the respective node; and providing each fixed point input value to the processing system for use in the neural network to generate the set of fixed point output values. Converting each fixed point output value to a corresponding floating point output value comprises dividing the fixed point output value by the respective scaling value associated with the with the respective node having the fixed point output value. The respective set of floating point weight values associated with each node of each layer represents a respective row or respective column in a weight matrix associated with the layer. Determining the respective scaling value for each respective node is performed from the set of floating point weight values associated with the respective node and one or more sets of floating point weight values each associated with a node other than the respective node. Determining the respective scaling value comprises: identifying, for each set of floating point weight values associated with a respective node, the floating point weight value with the greatest magnitude; identifying a largest representable value in the fixed point arithmetic used by the processing system to perform neural network computations; computing the respective scaling value for each set of floating point weight values based on a ratio of the magnitude of the respective floating point weight value with the greatest magnitude and the maximum representable value in the fixed point arithmetic. Converting each floating point weight value to a corresponding fixed-point weight value comprises multiplying each floating point weight value by the respective scaling value associated with the respective node having the floating point weight value.

Particular embodiments of the subject matter described in this specification can be implemented so as to realize one or more of the following advantages. Loss of accuracy resulting from numeric conversion of values pertaining to a neural network from floating point values to fixed point values and vice versa can be decreased. Converting floating point weight values to fixed point weight values as well as converting fixed point output values to floating point output values can lead to loss of accuracy of values. Localizing scaling values used for such conversions to one or more neural network nodes can reduce the loss of accuracy resulting from such conversions. Thus, the accuracy of outputs generated by a neural network processing system can be improved while still realizing the computational benefits of performing computations using fixed point arithmetic.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
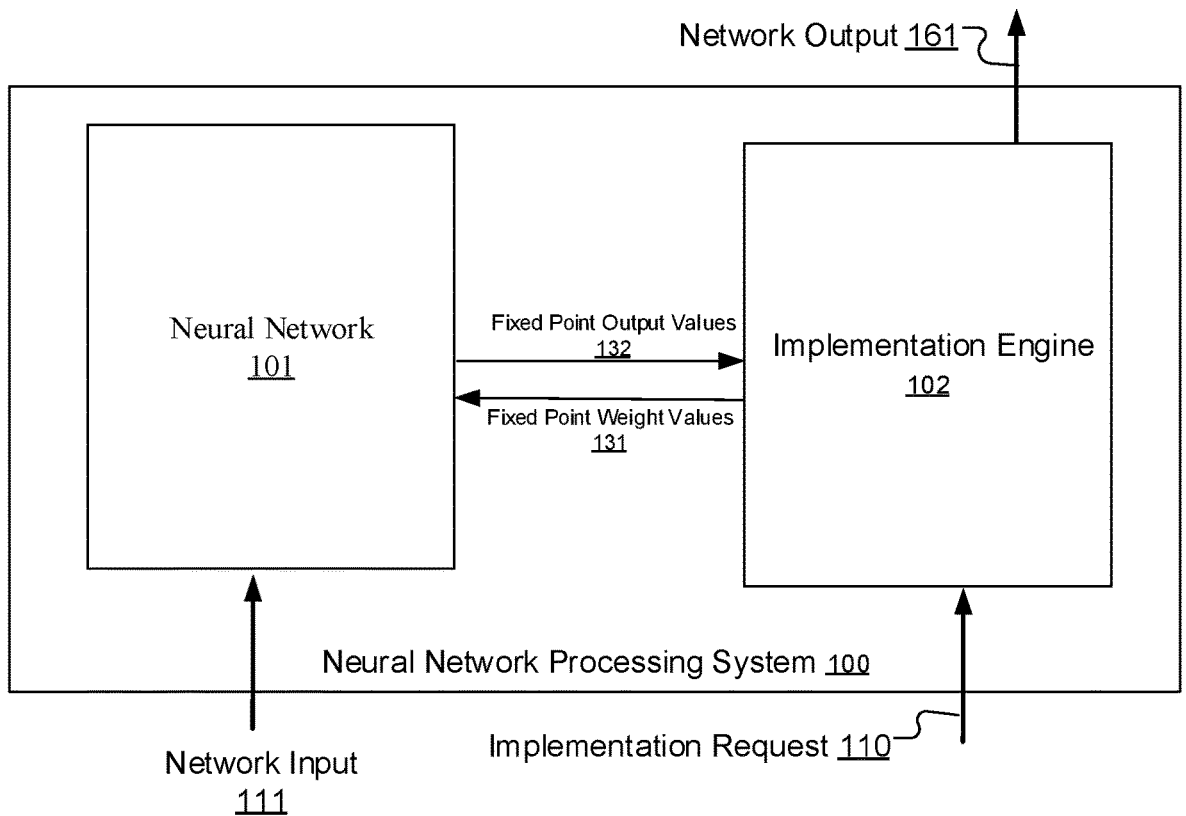
FIG. 1 shows an example neural network processing system.

FIG. 1 shows an example neural network processing system 100. The neural network processing system 100 is an example of a system implemented as computer programs on one or more computers in one or more locations, in which the systems, components, and techniques described below are implemented.

The neural network processing system 100 is a processing system that performs neural network computations using fixed point arithmetic.

Fixed point arithmetic refers to performing computations using fixed point data types. Fixed point data types represent real values by numbers that that have a fixed number of digits after the radix point. In computer systems, real values may be stored using integer values that are a measure of the application of one or more scaling values to the real values. For instance, a real value 1.234 may be represented as 1234 using the scaling value 1000. Because a set of fixed point numbers stored in a computer system have the same number of digits after their radix point, fixed point numbers can be stored and used with the same scaling values for all such numbers. For instance, if a computer system always allocates the last two bits of every byte to the decimal portion of all real values, then all such bytes can be converted to their corresponding real values by dividing the byte values by the scaling value 100.

In contrast, floating point data types represent real values by numbers that have a variable number of digits after the radix point. As such, floating point data types use different scaling values to store different real values.

Although using a floating point representation may increase the precision of storing real values, floating point computations are more computationally demanding. Therefore, some processing systems, including the neural network processing system 100, perform some or all of their computations using fixed point arithmetic. For example, the neural network processing system 100 may perform neural network computations using hardware that only supports fixed point arithmetic to increase processing speed, may store values associated with neural network computations, e.g., parameter values, using fixed point representations to decrease memory capacity required for performing the neural network computations, or both.

The neural network processing system 100 receives as an input a request 110 to implement a neural network 101 on the neural network processing system 100.

The neural network 101 is an example of a neural network that can be configured to receive any kind of digital data input and to generate any kind of score or classification output based on the input.

For example, if the inputs to the neural network 101 are images or features that have been extracted from images, the output generated by the neural network 101 for a given image may be scores for each of a set of object categories, with each score representing an estimated likelihood that the image contains an image of an object belonging to the category.

As another example, if the inputs to the neural network 101 are Internet resources (e.g., web pages), documents, or portions of documents or features extracted from Internet resources, documents, or portions of documents, the output generated by the neural network 101 for a given Internet resource, document, or portion of a document may be a score for each of a set of topics, with each score representing an estimated likelihood that the Internet resource, document, or document portion is about the topic.

As another example, if the inputs to the neural network processing system 100 are features of an impression context for a particular advertisement, the output generated by the neural network 101 may be a score that represents an estimated likelihood that the particular advertisement will be clicked on.

As another example, if the inputs to the neural network 101 are features of a personalized recommendation for a user, e.g., features characterizing the context for the recommendation, e.g., features characterizing previous actions taken by the user, the output generated by the neural network 101 may be a score for each of a set of content items, with each score representing an estimated likelihood that the user will respond favorably to being recommended the content item.

As another example, if the input to the neural network 101 is text in one language, the output generated by the neural network 101 may be a score for each of a set of pieces of text in another language, with each score representing an estimated likelihood that the piece of text in the other language is a proper translation of the input text into the other language.

As another example, if the input to the neural network 101 is a spoken utterance, a sequence of spoken utterances, or features derived from one of the two, the output generated by the neural network 101 may be a score for each of a set of pieces of text, each score representing an estimated likelihood that the piece of text is the correct transcript for the utterance or sequence of utterances.

The neural network 101 includes a number of neural network layers, including one or more input layers, one or more output layers, and one or more hidden layers. Each of the neural network layers include one or more neural network nodes. Each of the neural network nodes has one or more weight values. Each node processes each of a number of input values using a corresponding weight value and performs an operation on the result of that processing to generate an output value.

A weight value associated with a node is a measure of how much significance the node should assign to one of its input values. For a node in an input layer, a weight value is a measure of the significance of an input to the neural network 101. For a node in a hidden or output layer, a weight is a measure of the significance of an output of a layer preceding the node's layer.

In particular, the implementation request 110 includes floating point values of the weights for the nodes of the neural network 101. This may be because the weight values are adjusted during training by a training engine that conducts its processing using floating point values.

The neural network processing system 100 implements the neural network 101 for processing in accordance with the implementation request 110 using an implementation engine 102.

The implementation engine 102 converts floating point weight values to fixed point weight values 131 and fixed point output values 132 to floating point values. Because the neural network processing system 100 performs neural network 101 computations using fixed point arithmetic, the weight values for the nodes of the neural network 101 need to be fixed point values. Moreover, the output values 132 generated by the neural network 101 are fixed point values.

Converting floating point weight values to fixed point weight values 131 is described in greater detail below with reference to FIG. 2.

Once the implementation engine 102 has converted the floating point weight values to fixed point values, the neural network processing system 100 can receive a network input 111 to be processed by the neural network 101.

In some implementations, each node of each of the one or more input layers of the neural network 101 receives a set of floating point input values.

In some of those implementations, the implementation engine 102 converts each floating point input value of each node of each of the one or more input layers of the neural network 101 using the respective scaling value for respective node to generate a set of fixed point input values for the respective node.

The neural network 101 processes the network input using the neural network 101 to generate one or more fixed point output values 132, i.e., by performing fixed point computations using the fixed point weight values 131. The output values are values produced by nodes of an output layer of the neural network 101 during the processing of the network input.

The implementation engine 102 then generates a network output 161 by converting the fixed point output values 132 to floating point values. Converting fixed point output values 132 to floating point values to generate a network output is described below with reference to FIG. 3.

The neural network processing system 100 can store the generated network output 161 in an output data repository or provide the network output for use for some other purpose, e.g., for presentation on a user device or for further processing by another system.

Figure 2:
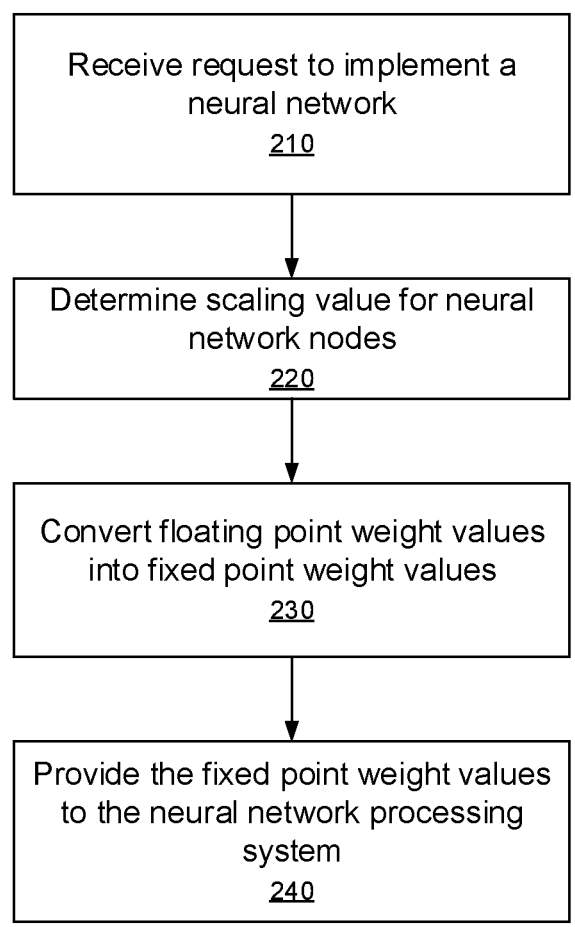
FIG. 2 is a flow chart of an example process for converting floating point neural network weight values to fixed point values.

FIG. 2 is a flow chart of an example process 200 for converting floating point neural network weight values to fixed point values. For convenience, the process 200 will be described as being performed by a system of one or more computers located in one or more locations. For example, a neural network processing system, e.g., the neural network processing system 100 of FIG. 1, appropriately programmed in accordance with this specification, can perform the process 200.

The system receives a request to implement a neural network on a processing system that performs neural network computations using fixed point arithmetic (210). The neural network includes a number of layers. Each layer has nodes, and each node of each layer has a set of floating point weight values.

In some implementations, each set of floating point weight values associated with a node represents a row or column in a weight matrix associated with the layer of the node. Thus, the weight matrix for a neural network layer includes all the weight values associated with the nodes of the layer.

The system determines a scaling value for each node from the set of floating point weight values for the node (220). As such, the system determines a scaling value that is local to the node and is determined based on the values of the floating point weight values of the node.

In some implementations, the system identifies the floating point weight value with the greatest magnitude from the floating point weight values associated with a node. The system then identifies the largest representable value in the fixed point arithmetic used by the processing system to perform neural network computations. The largest representable value is an upper-bound on the magnitude of values that a data type can represent (e.g., the value in the data type all of whose bits are "1" in a binary numeric representation system). The system then computes the scaling value for each set of floating point weight values based on a ratio of the magnitude of the respective floating point weight value with the greatest magnitude and the maximum representable value in the fixed point arithmetic.

For instance, the system identifies that the largest floating point weight value associated with a node $N_1$ is 0.45. The system then identifies that the system uses unsigned 8-bit integers to perform fixed point neural network computations. Therefore, the system identifies that the largest representable value in the fixed point arithmetic used by the processing system is $2^8-1=255$ (i.e., corresponding to binary value $11111111_2$). The system then divides 0.45 by 255 to compute the scaling value for the set of floating point weight values of $N_1$.

In some implementations, the system determines a common scaling value for two or more nodes of a neural network layer. In those implementations, the system divides the largest floating point weight value associated with any of the two or more nodes by the maximum representable value in the fixed point arithmetic used by the processing system to perform neural network computations.

The system converts each floating point weight value to a fixed point weight value using the scaling value for the node having the floating point weight value (230). In some implementations, the system multiplies each floating point weight value by the respective scaling associated with the respective node having the floating point weight value to generate a fixed point weight value.

The system provides the sets of fixed point floating point weight values to the processing system for use in neural network processing (240). The neural network processing system uses the weight values to process network inputs using the neural network to generate network output. In some implementations, during processing of a given network input and for each of the nodes, the neural network processing system multiplies each of the input values to the node by a corresponding fixed point weight value and sums the results of the multiplications to generate an activation input for the activation function of the node using fixed point arithmetic.

Figure 3:
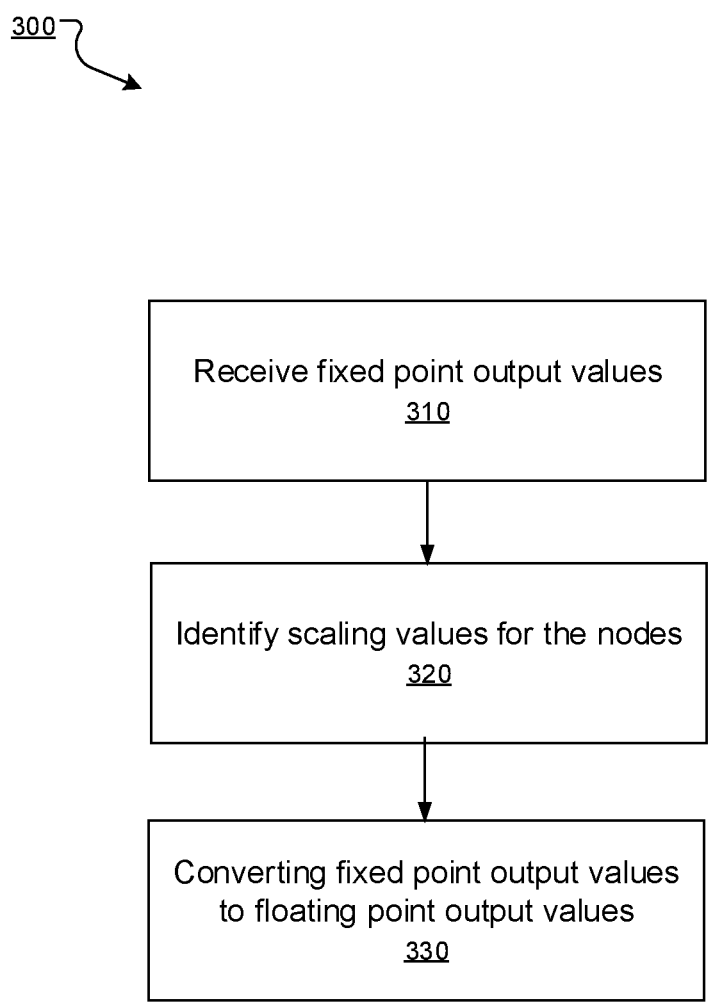
FIG. 3 is a flow chart of an example process for converting fixed point neural network output values to floating point values.

FIG. 3 is a flow chart of an example 300 for converting fixed point neural network output values to floating point values. For convenience, the process 300 will be described as being performed by a system of one or more computers located in one or more locations. For example, a neural network processing system, e.g., the neural network processing system 100 of FIG. 1, appropriately programmed in accordance with this specification, can perform the process 300.

The system receives a set of fixed point output values (310). The fixed point output values are generated by the processing system for a last layer of neural network (i.e., the output layer of the neural network). Each fixed point output value is the output of a node of the last layer.

The system identifies a scaling value for each node of the last layer (320). Computing scaling values for neural network nodes is described in further detail above with reference to FIG. 2.

The system converts each fixed point output value to a floating point output value (330). In some implementations, the system divides the fixed point output value by the respective scaling value associated with the respective node having the fixed point output value to generate a floating point output value for the node.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method comprising:
   receiving a request to process a neural network using a processing system that performs neural network computations using fixed point arithmetic,
      the neural network comprising a plurality of layers,
      at least one layer having a plurality of nodes, and
      at least one node of the at least one layer having a set of floating point weight values;
   for the at least one node of the at least one layer:
      determining a scaling value for the at least one node from the set of floating point weight values for the at least one node;
      converting each of the set of floating point weight values of the at least one node into a fixed point weight value using the scaling value for the at least one node to generate a set of fixed point weight values for the at least one node; and
      updating the neural network by replacing the set of floating point weight values for the at least one node with the set of fixed point weight values for the at least one node; and
   processing a network input using the updated neural network with the set of fixed point weight values to generate a network output.

2. The method of claim 1, further comprising:
   receiving a set of fixed point output values generated by the processing system for another layer of the plurality of layers, each of the set of fixed point output values corresponding to a respective node of the other layer; and
   converting each of the set of fixed point output values to a respective floating point output value using the scaling value of a corresponding node of the other layer.

3. The method of claim 2, further comprising:
   receiving a set of floating point input values for one or more input layer nodes of the updated neural network, wherein each of the one or more input layer nodes is in an input layer of the plurality of layers of the updated neural network;
   converting at least one of the set of floating point input values to at least one input layer node using a scaling value determined for the at least one input layer node to generate at least one fixed point input value for the at least one input layer node; and
   providing the at least one fixed point input value to the processing system to be processed by the updated neural network to generate a corresponding fixed point output value.

4. The method of claim 2, wherein converting the fixed point output value to the respective floating point output value comprises dividing the fixed point output value by the scaling value of the corresponding node.

5. The method of claim 1, wherein the set of floating point weight values represents a row or column in a weight matrix associated with the at least one layer.

6. The method of claim 1, wherein determining the scaling value for the at least one node comprises:
   determining the scaling value from the set of floating point weight values associated with the at least one node and additional sets of floating point weight values associated with additional nodes in the at least one layer.

7. The method of claim 1, wherein determining the scaling value comprises:
  identifying, for the set of floating point weight values, a floating point weight value with a largest magnitude;
  identifying a largest representable value in the fixed point arithmetic used by the processing system to perform neural network computations; and
  computing the scaling value for the set of floating point weight values based on a ratio of the largest magnitude and the largest representable value.

8. The method of claim 1, wherein converting each of the set of floating point weight values to the fixed-point weight value comprises:
  multiplying each of the set of floating point weight values by the scaling value.

9. A system comprising one or more computers and one or more storage devices storing instructions that are operable, when executed by the one or more computers, to cause the one or more computers to perform operations comprising:
  receiving a request to implement a neural network on a processing system that performs neural network computations using fixed point arithmetic,
  the neural network comprising a plurality of layers,
  at least one layer having a plurality of nodes, and
  at least one node of the at least one layer having a set of floating point weight values;
  for the at least one node of the at least one layer:
    determining a scaling value for the at least one node from the set of floating point weight values for the at least one node;
    converting each of the set of floating point weight values of the at least one node into a fixed point weight value using the scaling value for the at least one node to generate a set of fixed point weight values for the at least one node; and
    updating the neural network by replacing the set of floating point weight values for the at least one node with the set of fixed point weight values for the at least one node; and
  processing a network input using the updated neural network with the set of fixed point weight values to generate a network output.

10. The system of claim 9, further comprising:
  receiving a set of fixed point output values generated by the processing system for another layer of the plurality of layers, each of the set of fixed point output values corresponding to a respective node of the other layer; and
  converting each of the set of fixed point output values to a respective floating point output value using the scaling value of a corresponding node of the other layer.

11. The system of claim 10, further comprising:
  receiving a set of floating point input values for one or more input layer nodes of the updated neural network, wherein each of the one or more input layer nodes is in an input layer of the plurality of layers of the updated neural network;
  converting at least one of the set of floating point input values to at least one input layer node using a scaling value determined for the at least one input layer node to generate at least one fixed point input value for the at least one input layer node; and
  providing the at least one fixed point input value to the processing system to be processed by the updated neural network to generate a corresponding fixed point output value.

12. The system of claim 10, wherein converting the fixed point output value to the respective floating point output value comprises dividing the fixed point output value by the scaling value of the corresponding.

13. The system of claim 9, wherein the set of floating point weight values represents a row or column in a weight matrix associated with the at least one layer.

14. The system of claim 9, wherein determining the scaling value for the at least one node comprises:
  determining the scaling value from the set of floating point weight values associated with the at least one node and additional sets of floating point weight values associated with additional nodes in the least one layer.

15. The system of claim 9, wherein determining the scaling value comprises:
  identifying, for the set of floating point weight values, a floating point weight value with a largest magnitude;
  identifying a largest representable value in the fixed point arithmetic used by the processing system to perform neural network computations; and
  computing the scaling value for the set of floating point weight values based on a ratio of the largest magnitude and the largest representable value.

16. The system of claim 9, wherein converting each of the set of floating point weight values to the fixed-point weight value comprises:
  multiplying each of the set of floating point weight values by the scaling value.

17. A non-transitory computer storage medium encoded with instructions that, when executed by one or more computers, cause the one or more computers to perform operations comprising:
  receiving a request to process a neural network using a processing system that performs neural network computations using fixed point arithmetic,
  the neural network comprising a plurality of layers,
  at least one layer having a plurality of nodes, and
  at least one node of the at least one layer having a set of floating point weight values;
  for the at least one node of the at least one layer:
    determining a scaling value for the at least one node from the set of floating point weight values for the at least one node;
    converting each of the set of floating point weight values of the at least one node into a fixed point weight value using the scaling value for the at least one node to generate a set of fixed point weight values for the at least one node; and
    updating the neural network by replacing the set of floating point weight values for the at least one node with the set of fixed point weight values for the at least one node; and
  processing a network input using the updated neural network with the set of fixed point weight values to generate a network output.

18. The non-transitory computer storage medium of claim 17, further comprising:
  receiving a set of fixed point output values generated by the processing system for another layer of the plurality of layers, each of the set of fixed point output values corresponding to a respective node of the other layer; and
  converting each of the set of fixed point output values to a respective floating point output value using the scaling value of a corresponding node of the other layer.

19. The non-transitory computer storage medium of claim 18, further comprising:

receiving a set of floating point input values for one or more input layer nodes of the updated neural network, wherein each of the one or more input layer nodes is in an input layer of the plurality of layers of the updated neural network;

converting at least one of the set of floating point input values to at least one input layer node using a scaling value determined for the at least one input layer node to generate at least one fixed point input value for the at least one input layer node; and providing the at least one fixed point input value to the processing system to be processed by the updated neural network to generate a corresponding fixed point output value.

20. The non-transitory computer storage medium of claim 19, wherein converting the fixed point output value to the respective floating point output value comprises dividing the fixed point output value by the scaling value of the corresponding node.

21. The method of claim 1, wherein the scaling value is determined based at least in part on a maximum representable value in the fixed point arithmetic used by the processing system to perform neural network computations.

22. The method of claim 1, wherein the scaling value is determined based at least in part on a magnitude of a floating point weight value of the set of floating point weight values that are associated with the at least one node.

23. The method of claim 22, wherein the magnitude of the floating point weight value is the greatest magnitude of the set of floating point weight values associated with the at least one node.

24. The method of claim 23, wherein the scaling value is determined based on a ratio between the greatest magnitude and another value associated with the fixed pointed arithmetic used by the processing system to perform neural network computations.

25. The method of claim 21, wherein the scaling value is determined based on a ratio between the maximum representable value and another value derived from the set of floating point weight values associated with the at least one node.

26. The method of claim 1, wherein converting each of the set of floating point weight values of the at least one node into the fixed point weight value using the scaling value comprises converting sets of floating point weights value associated with respective nodes in a layer of the at least one layer based on the scaling value.

27. The system of claim 9, wherein the scaling value is determined based at least in part on a maximum representable value in the fixed point arithmetic used by the processing system to perform neural network computations.

28. The system of claim 9, wherein the scaling value is determined based at least in part on a magnitude of a floating point weight value of the set of floating point weight values that are associated with the at least one node.

29. The system of claim 28, wherein the magnitude of the floating point weight value is the greatest magnitude of the set of floating point weight values associated with the at least one node.

30. The system of claim 29, wherein the scaling value is determined based on a ratio between the greatest magnitude and another value associated with the fixed pointed arithmetic used by the processing system to perform neural network computations.

31. The system of claim 27, wherein the scaling value is determined based on a ratio between the maximum representable value and another value derived from the set of floating point weight values associated with the at least one node.

32. The system of claim 9, wherein converting each of the set of floating point weight values of the at least one node into the fixed point weight value using the scaling value comprises converting sets of floating point weights value associated with respective nodes in a layer of the at least one layer based on the scaling value.

* * * * *